July 5, 1938.  H. E. TAUTZ  2,122,966
DRILL PRESS TABLE OPERATING MEANS
Filed Aug. 31, 1936
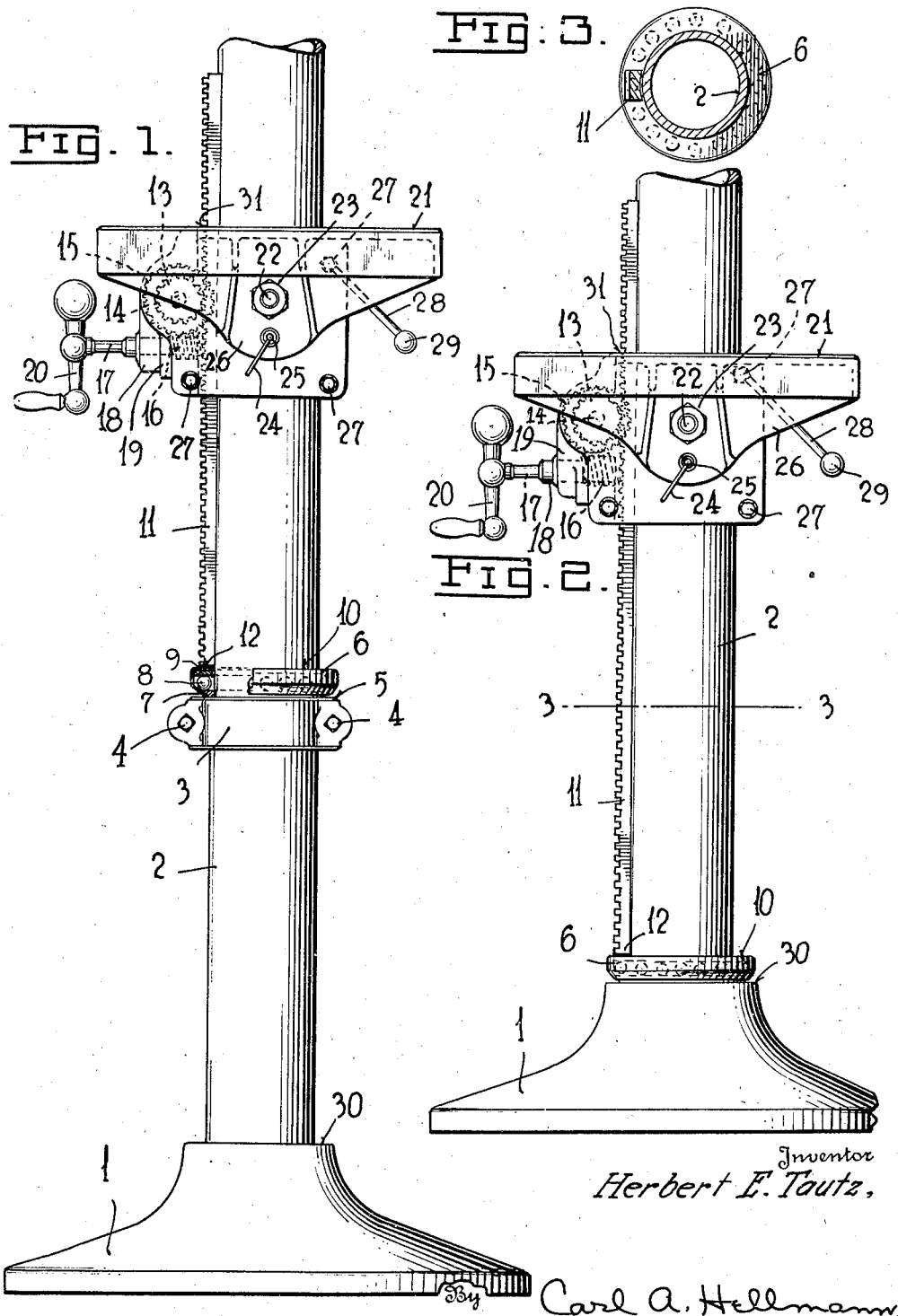
Inventor
Herbert E. Tautz,
By Carl A. Hellmann,
Attorney Patented July 5, 1938

2,122,966

UNITED STATES PATENT OFFICE 2,122,966

DRILL PRESS TABLE OPERATING MEANS

Herbert E. Tautz, Milwaukee, Wis., assignor to Delta Manufacturing Company, Milwaukee, Wis.

Application August 31, 1936, Serial No. 98,778

4 Claims. (Cl. 77—63)

This invention relates to means for elevating or depressing the table of a drill press or similar means, said table being so mounted as to be rotatable around the column of the drill press.

It relates particularly to mechanism for raising such tables gradually and also for preventing the said tables from falling down suddenly if the clamping device should become loosened.

More specifically, the device consists of means comprising a rack, a pinion meshing therewith, and means for operating said pinion which may consist of a worm and worm gear, with a crank or other device for actuating said worm, the rack being guided in a groove formed in the table-supporting bracket and the lower end of the rack resting upon an anti-friction device which preferably is located around the column of the drill press.

It has heretofore been proposed to provide means comprising a rack and pinion, together with actuating means for such pinion, to elevate the table of a machine of this kind, but such devices were unsuccessful except when the rack was made so short as to provide only a relatively small and, therefore, practically useless range of vertical movement of the table, because, as I have now found, when the rack was made long enough to be of real practical service, the friction produced at the lower end of the rack where it abutted against the face of the column was sufficient to bend the rack sufficiently out of its proper vertical position to cause it at least to bind and make its operation by the pinion impossible and often also to actually bend the rack out of shape, thus permanently injuring the mechanism.

I have found the above mentioned friction to be the reason for the faulty operation of devices of this nature and have provided a remedy for the same by providing an anti-friction device for supporting the lower end of the rack bar. Due to the usually heavy weight of the drill press table and the associated operating mechanism, the pressure exerted by the rack bar upon its support on the base of the column was excessive and this caused the binding action above referred to, and I have remedied this defect by providing a thrust bearing to ease the friction, preferably a ball or roller thrust bearing.

I have disclosed a preferred embodiment of the invention in the present specification and illustrated it in the accompanying drawing, wherein:

Fig. 1 is a front elevation of a portion of the base and column of a drill press, with the drill table supported thereby and embodying features of my invention.

Fig. 2 is a slightly modified form of the same.

Fig. 3 is a section of the column and rack shown in Fig. 2 on the plane indicated by the line 3—3.

All the figures are more or less diagrammatic.

Referring now to Fig. 1, there is shown a base 1 supporting a column 2 to which a split collar 3 may be secured so as to be vertically adjustable by any suitable means, such as the bolts 4.

Upon the upper surface 5 of the said collar rests a thrust bearing 6 of any suitable type comprising a lower bearing plate 7, a plurality of balls 8, an upper bearing plate 9 and a protecting cover 10. This bearing may be of any suitable type and while illustrated diagrammatically as a ball bearing may, of course, also be made with rollers if preferred, as the exact nature of the bearing does not form a part of the present invention.

A rack bar 11 has its lower end 12 supported by the thrust bearing 6 by resting upon the same and cooperates with a pinion 13 secured on a common shaft 14 with a worm wheel 15 which in turn meshes with a worm 16 operatively mounted on the shaft 17 carried by the bearing 18 of the housing 19, said shaft 17 having a ball crank 20 or other suitable manipulating crank device mounted thereon as shown.

The housing 19 carries the table 21 which is secured to said housing by means of the bolt 22 and nut 23 so as to pivot about said bolt 22 when the nut 23 is loosened. In order to secure the table 21 in its customary or normal position, which is with the plane of its top at right angles to the axis of the column 2, a suitable pin 24, having a bent end for convenience of manipulation, may be engaged in a hole 25 formed in the lower flange 26 of the table and also in the housing 19, so that when said pin is engaged in said hole the table 21 cannot turn about the pivot 22, but will automatically be maintained in its normal position.

The housing 19 is preferably longitudinally split in the customary way and is secured to the column 2 with the desired degree of tightness by means of bolts and nuts 27 which may be tightened to the desired degree. A lever 28 having an enlarged head 29 may cooperate with one of said bolts or nuts 27 so as to afford rapid means for manually tightening or loosening the table 21 with respect to the column 2.

In Fig. 2 all the parts enumerated with respect to Fig. 1 are also shown and designated by the same reference characters with the exception that in this modified form the collar 3 is omitted and the thrust bearing 6 rests directly upon the flat surface 30 formed at the top of the base 1.

The operation of the device will be readily understood from the above description of its construction.

Referring first to the Fig. 1 form, the collar 3 will be adjusted manually to any suitable desired height on the column 2 and clamped there by the bolts and nuts 4. The housing 19 which carries the table 21 will then be brought to the desired degree of looseness about the column 2 to permit the ready adjustment of the table 21 up and down along said column and also in a horizontal rotary manner around said column to correspond to the work being done by the drill press or other mechanism of which it forms a part at the time in question.

In order to adjust the table 21 to the proper height the ball crank 20 will be turned manually in the proper direction to cause the worm 16 to turn the worm wheel 15 in the proper direction and to the proper extent to raise or lower the table 21, this being accomplished by means of the pinion 13 and the rack 11 in engagement therewith.

Having adjusted the table to the proper height in this manner it may then be necessary to rotate said table about the column 2 to properly aline the workpiece carried thereby at the time with the drill or other tool. This is accomplished by manually engaging the table 21 and shifting it to the desired position by turning it about the said column.

It will be obvious that because of the self-locking nature of the worm and worm wheel drive the table 21 will automatically remain in whatever vertical position it has been placed, so that the table 21 cannot drop suddenly if the bolts and nuts 27 are inadvertently left too loose, thus avoiding damage, particularly in the hands of inexperienced operators.

In previous constructions of this type there was great difficulty in making the rotary adjustment because in such previous constructions there was no anti-friction device 6 provided at the lower end of the rack bar 11 and the consequence was that because of the relatively great weight of the housing 19 and the mechanism contained therein, together with the machine table 21, the lower end of the rack bar 11 was caused to bind or seize against its supporting means, thus producing sufficient frictional force to make it practically impossible to turn the table 21 about the column without binding and in many cases without permanently injuring the rack bar 11. This has now been obviated by means of the anti-friction device 6 which avoids the development of any material frictional force resisting the movement of the lower end 12 of the rack bar 11 and thus automatically prevents any injury or binding.

It will be understood, of course, that the rack bar 11 is not secured in any way to either the housing 19, the column 2, or the bearing 6 although if preferred no harm would be done by positively securing the lower end 12 to the upper movable portion of the bearing 6. The rack slides freely through the opening or keyway 31 provided in the housing 19. The rack bar is, therefore, readily removable or interchangeable for others of different length or a new one may be substituted readily for a defective or damaged one.

At the same time that the present construction eliminates the possibility of binding or injury it also materially decreases the manual effort necessary to turn the table 21 about the column 2 and thus has several advantages.

When the table 21 has been brought to its final position of adjustment it may, of course, be held there by manipulating the lever 28 by means of its knob 29 to tighten the corresponding bolt or nut 27 and thus tightly hold the housing 19 on the column 2.

In the Fig. 2 form, the operation and construction are, of course, identical with those of Fig. 1, except that since no adjustable collar 3 is provided, use is made instead of the upper flat surface 30 already present at the top of the base 1. The Fig. 1 form permits the use of a somewhat shorter rack bar 11 than the Fig. 2 form and each form may be preferred for some particular use.

Having described my invention and stated the advantages thereof it will be obvious that it may be embodied also in other forms and it will, therefore, be understood that the invention is not to be limited to a drill press but may find employment in any other tool wherein it is necessary to adjust a heavy table by vertical and rotary movements combined, and the invention is, therefore, to be considered as limited only by the following claims.

I claim:

1. In a machine tool having a relatively stationary column and a table supported thereby, said table having a slot adjacent the column, means rotatable around the column for adjusting said table vertically, said means comprising a rack bar extending along said column, and through the slot in said table, a pinion carried by said table and in mesh with the rack bar, and anti-friction means for supporting the lower end of said rack bar, said anti-friction means encircling the said column, said rack bar being guided by the sides of the slot and having its lower end resting upon the anti-friction means, whereby the rack bar is freely removable from the machine tool in an upward direction.

2. In a machine tool having a relatively stationary column and a table supported thereby, means rotatable on the column for adjusting said table vertically, said means comprising a rack bar extending along said column, a pinion carried by the table and in mesh with the said rack bar, anti-friction means for supporting the lower end of said rack bar, said rack bar being freely removable in an upward direction, said anti-friction means being arranged around the said column, a collar adjustable along said column for supporting said anti-friction means, and means for securing said collar in its adjusted position.

3. In a machine tool having a relatively stationary column and a table supported thereby, means rotatable on the column for adjusting said table vertically, said means comprising a rack bar extending along said column, a pinion carried by the table and in mesh with the said rack bar, anti-friction means for supporting the lower end of said rack bar, said rack bar being freely removable in an upward direction, said anti-friction means being arranged around the said column, and means secured to the column for supporting said anti-friction means.

4. In a machine tool having a relatively stationary column and a table supported thereby, means attached to the table and rotatable on the column for adjusting said table vertically, said means comprising a sliding collar embracing the column and extending therealong and means for adjusting said table vertically, said adjusting means comprising a rack bar which extends along the column and whose length is at least three times the vertical height of the said collar, a pinion carried by said table and in mesh with said rack bar, anti-friction means for supporting the lower end of said rack bar, said anti-friction means being arranged around the said column and means secured to the column for supporting said anti-friction means, the rack bar being freely rotatable around the column and being freely removable from the machine in an upward direction.

HERBERT E. TAUTZ.